(12) United States Patent
Ray

(10) Patent No.: US 6,648,013 B1
(45) Date of Patent: Nov. 18, 2003

(54) CHECK VALVE HAVING VARIABLE OPENING-FORCE THRESHOLD

(75) Inventor: Ernest B. Ray, Marysville, CA (US)

(73) Assignee: Watts Industries, Inc., North Andover, MA (US)

( * ) Notice: Subject to any disclaimer, the term of this patent is extended or adjusted under 35 U.S.C. 154(b) by 0 days.

(21) Appl. No.: 09/886,911

(22) Filed: Jun. 20, 2001

(51) Int. Cl.$^7$ ............................................... F16K 15/03
(52) U.S. Cl. ........................................ 137/527; 251/337
(58) Field of Search ............................. 137/527, 527.2, 137/527.6, 531; 251/337

(56) References Cited

U.S. PATENT DOCUMENTS

| | | | | |
|---|---|---|---|---|
| 2,064,247 A | * | 12/1936 | Evans | 137/527 X |
| 2,827,921 A | * | 3/1958 | Sherman et al. | 137/527 |
| 2,927,182 A | * | 3/1960 | Barkan et al. | 137/527 X |
| 3,334,858 A | | 8/1967 | Hay | |
| 3,478,778 A | * | 11/1969 | Curtiss et al. | 137/531 |
| 3,482,603 A | | 12/1969 | Outcalt | |
| 3,789,874 A | | 2/1974 | Hills | |
| 3,972,504 A | | 8/1976 | DiSabatino, Jr. | |
| 3,996,962 A | * | 12/1976 | Sutherland | 137/527.4 |
| 4,019,532 A | * | 4/1977 | Schittek | 137/527 |
| 4,063,570 A | | 12/1977 | Mitchell | |
| 4,188,973 A | | 2/1980 | Weise | |
| 4,230,150 A | | 10/1980 | Scaramucci | |
| 4,281,680 A | | 8/1981 | Ripert | |
| 4,595,032 A | * | 6/1986 | Banks | 137/527 |
| 4,887,792 A | | 12/1989 | Kuo | |
| 4,989,635 A | * | 2/1991 | Dunmire | 137/527 |
| 5,046,525 A | * | 9/1991 | Powell | 137/527 |
| 5,146,949 A | * | 9/1992 | Retzloff et al. | 137/527 |
| 5,236,009 A | * | 8/1993 | Ackroyd | 137/527 |
| 5,411,056 A | | 5/1995 | Solaroli | |
| 5,584,315 A | | 12/1996 | Powell | |
| 5,671,769 A | | 9/1997 | Booth | |
| 5,709,240 A | | 1/1998 | Martin | |
| 5,711,341 A | | 1/1998 | Funderburk | |
| 5,794,655 A | | 8/1998 | Funderburk | |
| 5,855,224 A | | 1/1999 | Lin | |
| 6,050,293 A | | 4/2000 | Lin | |
| 6,314,993 B1 | | 11/2001 | Matthews | |
| 6,343,618 B1 | * | 2/2002 | Britt et al. | 137/527 |

FOREIGN PATENT DOCUMENTS

| | | |
|---|---|---|
| EP | 0 797 033 | 9/1997 |
| EP | 0 820 959 | 1/1998 |
| GB | 532241 | 1/1941 |

\* cited by examiner

*Primary Examiner*—John Rivell
(74) *Attorney, Agent, or Firm*—Fish & Richardson P.C.

(57) ABSTRACT

A check valve is provided to maintain fluid flow in a single desired direction through a conduit. The check valve requires a greater fluid pressure to open the check valve to allow fluid to pass in a desired direction than an amount of pressure required to keep the check valve in its open position. This variable opening force performance is provided by providing a closure arm exerting a closure force on a flapper urging the flapper toward its closed position. Contact between the closure arm and the flapper occurs between a follower on the closure arm and a cam surface on the flapper. A contour of the cam surface on the flapper, and especially a hump on the cam surface causes the closure arm to exert a variable amount of force on the flapper depending on the position of the flapper. When the flapper is closed a relatively large amount of force is exerted on the flapper. When the flapper is open a relatively smaller amount of force is exerted on the flapper by the closure arm. The dimensions and contours of the follower and the cam surface can be customized to provide desired closure arm force exerting characteristics for the check valve of this invention.

31 Claims, 6 Drawing Sheets

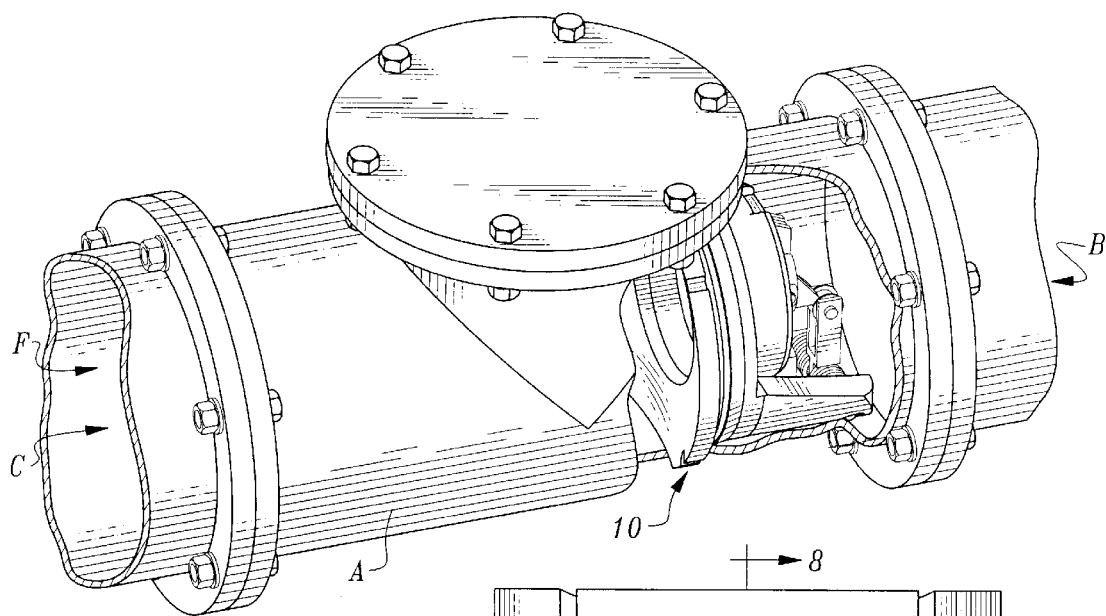
Fig. 3
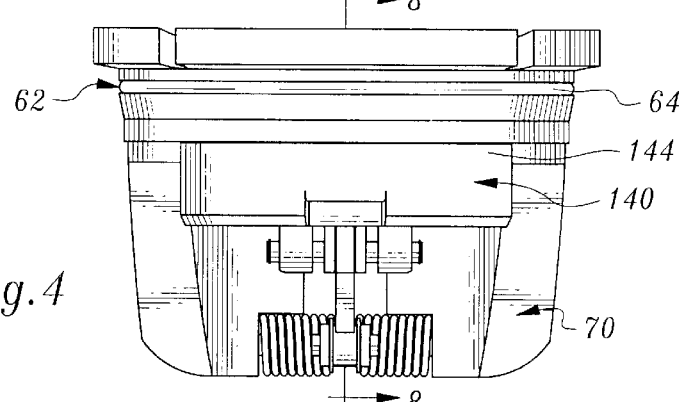
Fig. 4
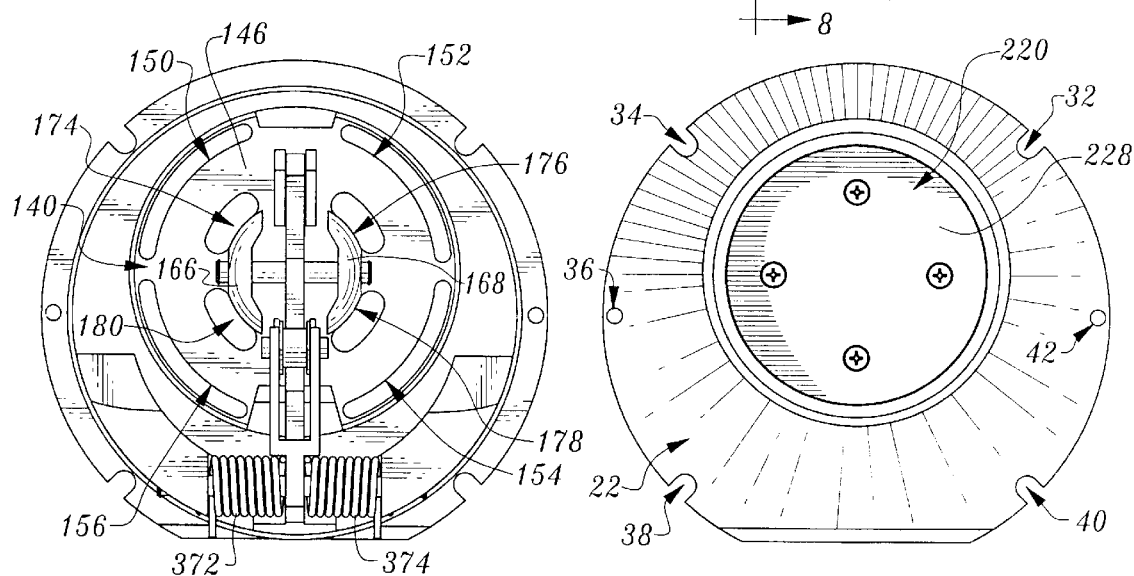
Fig. 5
Fig. 6

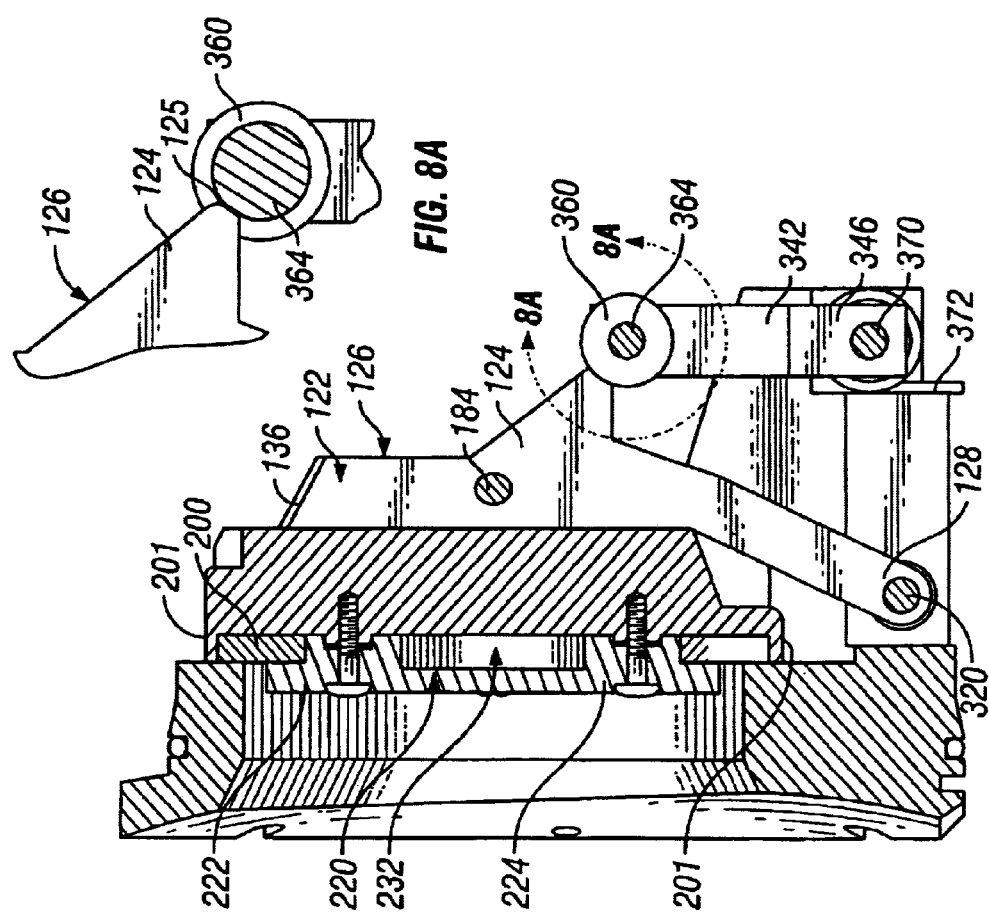
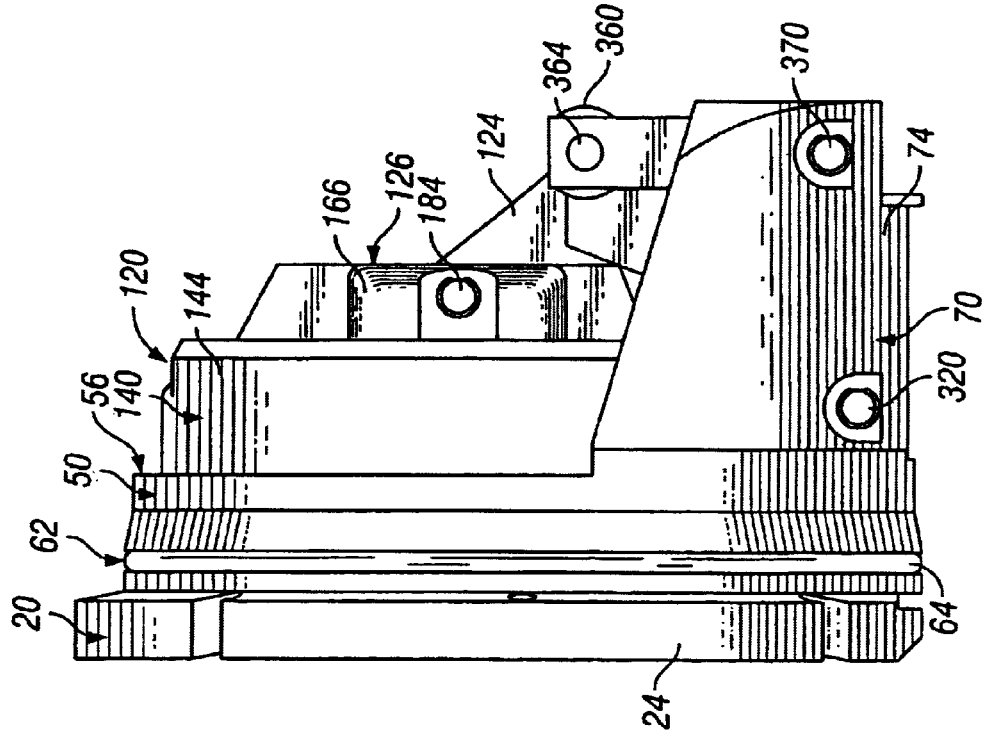

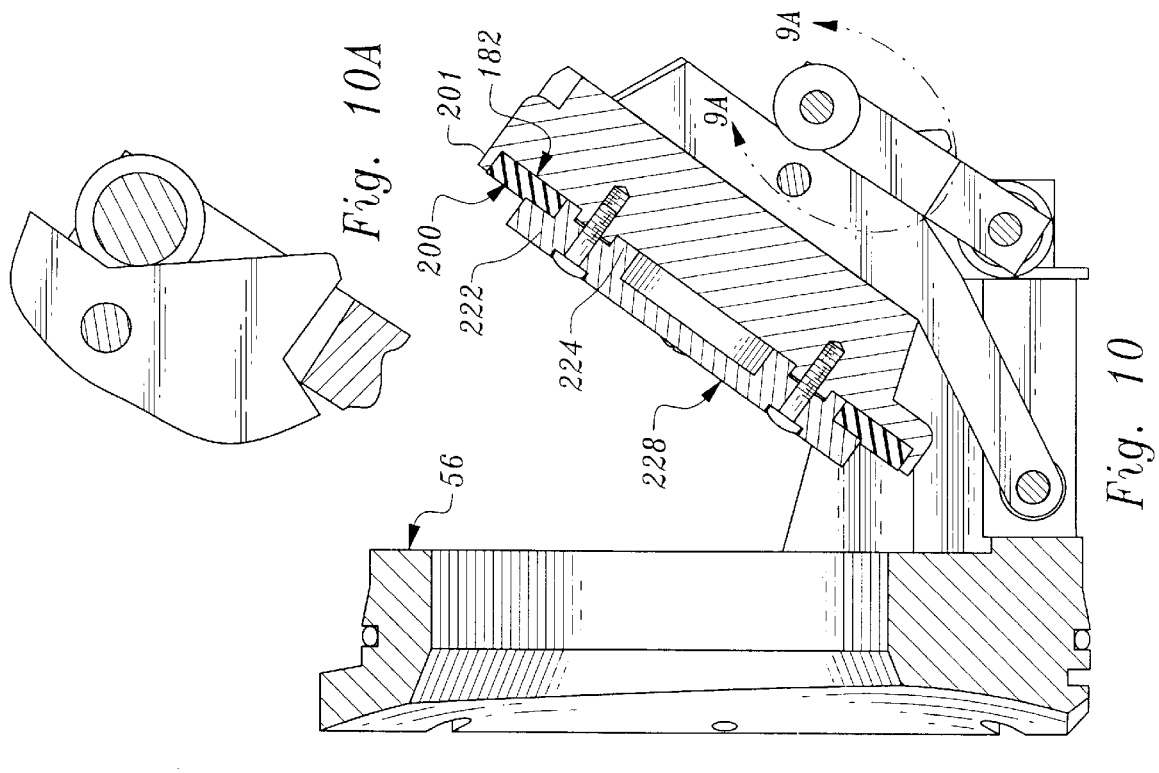
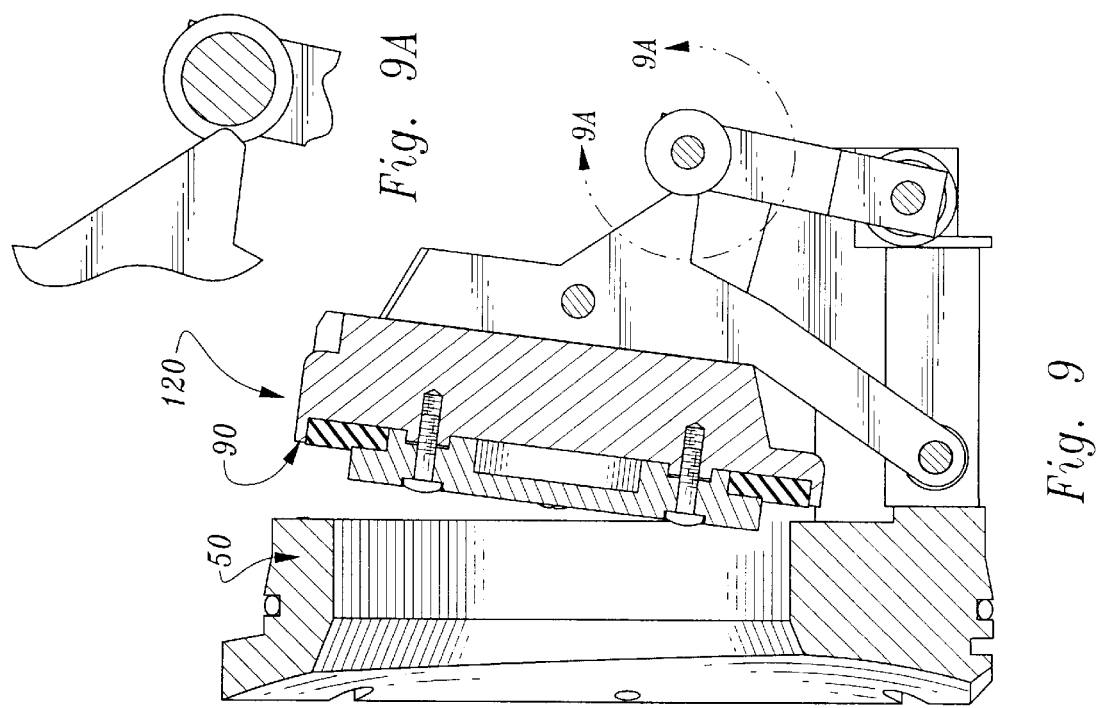

CHECK VALVE HAVING VARIABLE OPENING-FORCE THRESHOLD

FIELD OF THE INVENTION

This present invention relates generally to check valves for keeping fluid from traveling in a reverse direction and more specifically, to a check valve having a variable opening-force threshold.

BACKGROUND OF THE INVENTION

Backflow check valves are typically utilized in fluid-carrying pipelines to prevent the backflow or return of downstream fluids, such as from service lines or main supply lines. Such backflow check valves are commonly situated between the main supply line and a facility's (school, home, etc.) service line. Examples of such check valves may be found by reference to U.S. Pat. No. 6,050,293 to Lin et al., U.S. Pat. No. 3,789,874 to Hills, U.S. Pat. No. 4,887,792 to Kuo, U.S. Pat. No. 3,482,603 to Outcalt and U.S. Pat. No. 3,334,858 to Hay.

Though Hills, Kuo, Outcalt, and Hay all disclose a check valve assembly for backflow prevention in pipelines, their designs are disadvantageous in light of the present invention. All of the aforementioned devices require a specific predetermined threshold fluid pressure to initially open the check valve, and thereafter, require the fluid pressure to remain relatively constant, if not greater, to maintain the check valve in an open position. A decrease in fluid pressure often results in check valve "flutter" and the associated signature noise, wherein the flutter noise is caused by the valve plate flapping back and forth due to the lack of requisite pressure to maintain the check valve in a consistently open position. Furthermore, none of the aforementioned devices incorporate into their design the ability to allow opening of the check valve upon variance of fluid flow threshold.

Therefore, it is readily apparent that there is a need for a check valve having a variable opening force threshold, wherein the check valve requires a relatively larger initial forward flow pressure to open the check valve but thereafter requires a relatively smaller forward-flow pressure to keep the check valve in an open position, thereby reducing check valve "flutter" and allowing closure of the check valve upon the ceasing of forward flow and/or the initiation of backflow.

SUMMARY OF THE INVENTION

Briefly described, in a preferred embodiment, the present invention overcomes the above-mentioned disadvantages and meets the recognized need for such a device by providing a check valve with variable opening force threshold, wherein the check valve requires a relatively large initial forward-flow pressure to open the check valve but thereafter, only requires a relatively small forward-flow pressure to maintain the check valve in an open position. As such, the present invention reduces check-valve flutter and allows closure of the valve upon backflow or if forward flow is reduced below a predetermined minimum threshold.

According to its major aspects and broadly stated, the present invention in its preferred form is a check valve generally comprising a check-valve assembly having a mounting member, a buttress, a valve seat, a valve plate, a pivotable cam arm, a pivotable closure arm and a follower wheel.

More specifically, the present invention is a check valve having a mounting member to secure the check-valve assembly into a body such as a pipeline. The mounting member preferably includes a mounting section, a valve seat section and a buttress, wherein the buttress carries a flapper assembly, a pivotable cam arm and a pivotable closure arm. The flapper assembly generally has a valve plate and a plate cap. The valve plate is attached to the pivotable cam arm. The pivotable cam arm includes a hump forming a cam surface opposite the valve plate. A follower wheel attached to the pivotable closure arm rests on the cam surface of the hump. When a forward flow of fluid pushes against the plate cap, the follower wheel of the pivotable closure arm must first overcome the hump of the pivotable cam arm to open the valve. Upon reaching a predetermined opening threshold pressure, the pivotable closure arm is sufficiently loaded that the attached follower wheel overcomes the cam hump thus allowing the valve to fully open. Thereafter, only minimal force is required to maintain the valve in an open position due to the contour of the remainder of the cam surface.

OBJECTS OF THE INVENTION

A feature and advantage of the present invention is the novel and unique initial opening-force threshold of the device.

A feature and advantage of the present invention is the ability of the check valve, after reaching the initial opening-force threshold, to remain open with relatively slow fluid flow or minimum pressure.

A feature and advantage of the present invention is the ability of the check valve to remain open with relatively slow fluid flow yet still avoid check valve flutter commonly associated with such conditions.

A feature and advantage of the present invention is that the hump on the pivotable cam arm can be varied in size, shape and slope to adjust the overall performance of the check valve relative to the initial forward flow force and thus create a suitable check valve for any fluid flow conditions.

A feature and advantage of the present invention is its ability to be incorporated into any environment where prevention of fluid backflow is desired.

These and other objects, features and advantages of the invention will become more apparent to one skilled in the art from the following descriptions and claims when read in light of the accompanying drawings.

BRIEF DESCRIPTION OF THE DRAWINGS

The present invention will be better understood by reading the detailed description of the preferred and alternate embodiments with reference to the accompanying drawing figures, in which like reference numerals denote similar structure and refer to like elements throughout, and in which:

FIG. 3 is a partial cutaway perspective view a check-valve assembly according to a preferred embodiment of the present invention showing the check-valve assembly mounted in a pipe.

FIG. 4 is a top plan view of a check-valve assembly according to a preferred embodiment of the present invention.

FIG. 5 is a posterior elevation view of a check-valve assembly according to a preferred embodiment of the present invention.

FIG. 6 is an anterior elevation view of a check-valve assembly according to a preferred embodiment of the present invention.

FIG. 7 is a side elevation view of a check-valve assembly according to a preferred embodiment of the present invention.

FIG. 8 is a section view along line 8—8 of FIG. 4 of a check-valve assembly according to a preferred embodiment of the present invention showing the check-valve assembly in a closed position.

FIG. 8A is a detailed section view of a portion of FIG. 8, taken along line 8A—8A of FIG. 8 and showing the follower wheel of the pivotable closure arm resting on the hump of the cam surface when the check-valve assembly is in the closed position.

FIG. 9 is a section view similar to that of FIG. 8, but showing the check-valve assembly in an initially partially opened position.

FIG. 9A is a detailed section view of a portion of FIG. 9, taken along line 9A—9A of FIG. 9 and showing the follower wheel of the pivotable closure arm resting just past the hump of the cam surface when the check-valve assembly is in the initially partially opened position.

FIG. 10 is a section view similar to that of FIG. 8, but showing the check-valve assembly in a fully opened position.

FIG. 10A is a detailed section view of a portion of FIG. 10, taken along line 10A—10A of FIG. 10 and showing the follower wheel of the pivotable closure arm resting on the upper ramp portion of the cam surface when the check-valve assembly is fully opened.

DESCRIPTION OF THE PREFERRED EMBODIMENT

In describing the preferred and alternate embodiments of the present invention, as illustrated in FIGS. 1–12, specific terminology is employed for the sake of clarity. The invention, however, is not intended to be limited to the specific terminology so selected, and it is to be understood that each specific element includes all technical equivalents that operate in a similar manner to accomplish similar functions.

Figures 1, 2:
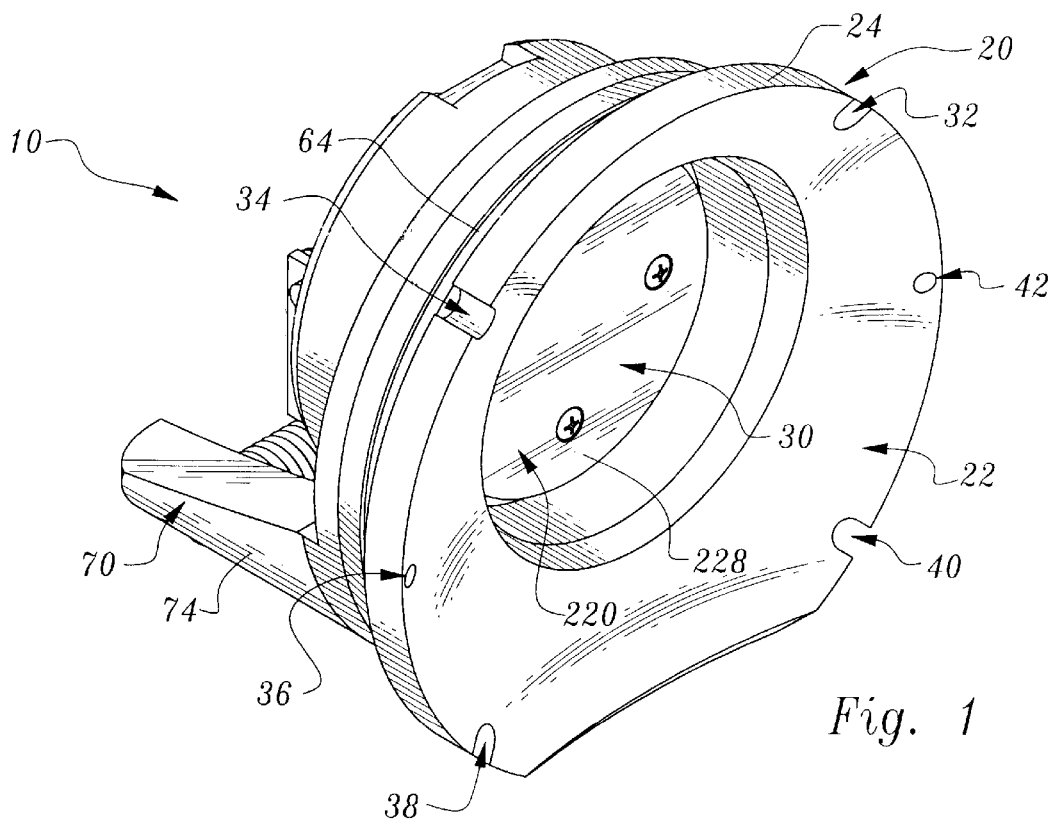
FIG. 1 is a top perspective anterior view of a check-valve assembly according to a preferred embodiment of the present invention.
FIG. 2 is a top perspective posterior view of a check-valve assembly according to a preferred embodiment of the present invention.

Referring now to FIGS. 1–2, the present invention in its preferred embodiment is a check-valve assembly 10, wherein check-valve assembly 10 generally is formed of three assemblies which can move relative to each other including a mounting member 20, a flapper assembly 120 and a pivotable closure arm assembly 340.

More specifically, mounting member 20 is preferably approximately circular and ring-like in shape having a mounting section 22, a valve seat section 50 and a valve buttress 70. Valve seat section 50 preferably has a reduced diameter as compared to mounting section 22, thereby forming lip 24 on mounting section 22 and lip 52 on valve seat section 50. Mounting section 22 preferably has mounting throughholes 32, 34, 36 and 38 formed through and on the outer edge of lip 24 of mounting section 22 and mounting throughholes 40 and 42 formed through lip 24 of mounting section 22 for securing check-valve assembly 10 to body A (FIG. 3). Body A is any housing unit commonly known and used in the art of fluid flow such as, for exemplary purposes only, pipes for carrying and transporting fluids. Surface 54 of valve seat section 50 defines valve seat 56, wherein valve seat 56 serves as a sealing surface when flapper assembly 120 is in the closed position. To allow for the movement of fluid through mounting member 20, mounting section 22 and valve seat section 50 of mounting member 20 further define a preferably centrally positioned passage 30 therethrough.

Figure 11:
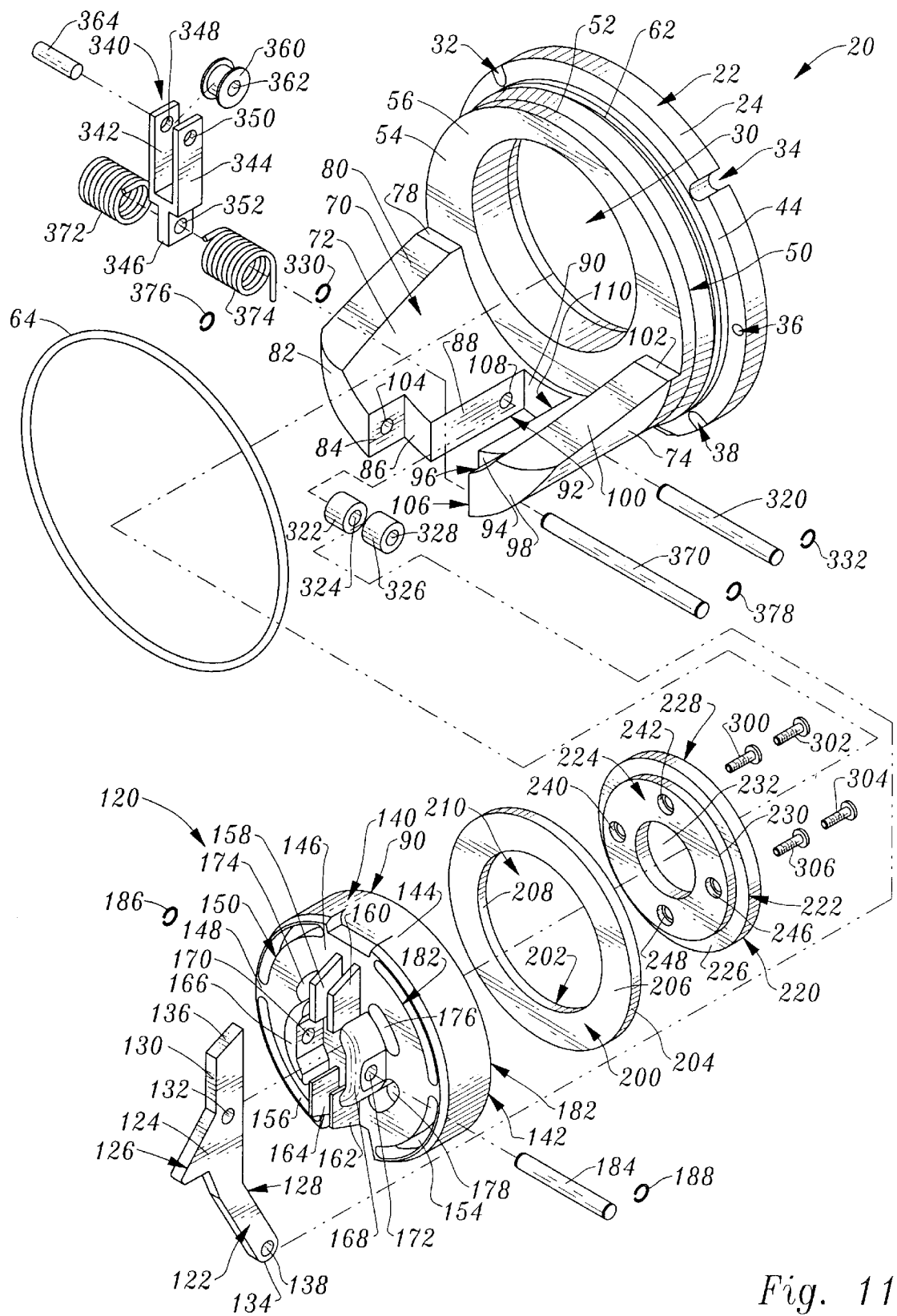
FIG. 11 is an exploded perspective view of a check valve assembly according to a preferred embodiment of the present invention.

Now referring more particularly to FIGS. 2 and 11, buttress 70 extends preferably generally perpendicular from the lower portion of surface 54 of valve seat section 50. Buttress 70 is preferably semi-circular or trough-like in shape and comprises a top wall 72 and a bottom wall 74 joined with a first sidewall 78, a second sidewall 80, a third sidewall 82, a fourth sidewall 84, a fifth sidewall 86, a sixth sidewall 88, a seventh sidewall 90, an eighth sidewall 92, a ninth sidewall 94, a tenth sidewall 96, an eleventh sidewall 98, a twelfth sidewall 100 and a thirteenth sidewall 102.

Specifically, first sidewall 78 extends approximately perpendicular from surface 54 toward the posterior of check-valve assembly 10 to second sidewall 80. Second sidewall 80 extends from first sidewall 78 in a preferably downwardly sloping manner toward the posterior of check-valve assembly 10 to third sidewall 82. Third sidewall 82 extends preferably downwardly from second sidewall 80 to fourth sidewall 84. Fourth sidewall 84 extends approximately perpendicular from third sidewall 82 toward the anterior of check-valve assembly 10 to fifth sidewall 86, wherein first closure arm pin throughhole 104 is formed generally centered on forth sidewall 84.

Fifth sidewall 86 extends approximately perpendicular from fourth sidewall 84 to sixth sidewall 88. Sixth sidewall 88 extends approximately perpendicular from fifth sidewall 86 toward the anterior of check-valve assembly 10 to seventh sidewall 90, wherein first cam arm pin throughhole 108 is formed in sixth sidewall 88 proximal to seventh sidewall 90.

Seventh sidewall 90 extends approximately perpendicular from sixth sidewall 88 and approximately parallel with surface 54 to eighth sidewall 92. Eighth sidewall 92 extends approximately perpendicular from seventh sidewall 90 toward the posterior of check-valve assembly 10 to ninth sidewall 94, wherein eighth sidewall 92 has a second cam arm pin throughhole 110 formed therein proximal to seventh sidewall 90 and wherein first cam arm pin throughhole 108 aligns with second cam arm pin throughhole 110.

Ninth sidewall 94 extends approximately perpendicular from eighth sidewall 92 to tenth sidewall 96. Tenth sidewall 96 extends approximately perpendicular from ninth sidewall 94 toward the posterior of check-valve assembly 10 to eleventh sidewall 98, wherein second closure arm pin throughhole 106 is formed generally centered on tenth sidewall 96. Eleventh sidewall 98 extends preferably upward and approximately perpendicular from tenth sidewall 96 to twelfth sidewall 100. Twelfth sidewall 100 extends from eleventh sidewall 98 to thirteenth sidewall 102 in a preferably upwardly sloping manner. Thirteenth sidewall 102 extends from twelfth sidewall 100 to surface 54 of valve seat section 50, wherein thirteenth sidewall 102 is approximately perpendicular to surface 54.

Mounting section 22, valve seat section 50 and buttress 70 can all be formed as a single molded or machined unit from any material and/or method known within the art to form mounting member 20. Alternatively, mounting section 22, valve seat section 50, and buttress 70 can all be separately molded or machined from any material and/or method known within the art and thereafter attached together by any method known within the art.

More specifically, referring now to FIGS. 2, 8 and 11, flapper assembly 120 generally comprises a pivotable cam arm 122, a valve plate assembly 140, a plate seal 200 and a closure plate 220. Preferably, cam arm 122 is preferably generally an elongated rectangular-shaped member, wherein the first elongated sidewall 128 of cam arm 122 is bent slightly inward proximal to the mid-region of first elongated sidewall 128 thereby producing an angled leg portion. A nose portion 124 extends from second elongated sidewall 130 proximal to the mid-region thereof. The upper surface of nose portion 124 is generally ramped and serves as caming surface 126 for follower wheel 360. Nose portion 124 preferably has a distal end that serves as a hump 125 for the follower wheel 360 to overcome during use, as more fully described below. A throughhole 132 is positioned preferably equa-distant from the mid-region and the first end 136 of cam arm 122 for mounting cam arm 122 to flapper assembly 120. A throughhole 134 is positioned proximal to the second end 138 of cam arm 122 for pivotably mounting cam arm 122 to buttress 70. Second end 138 of cam arm 122 is preferably rounded or tapered to facilitate pivotation of cam arm 122 while mounted to buttress 70. While only one cam arm 122 is shown, multiple arms could pivotably support the flapper assembly relative to the buttress 70 of the mounting member 20.

Valve plate assembly 140 is preferably circularly shaped and comprises a front wall 142 and a rear wall 146 joined by an outer peripheral wall 144. Along periphery 148 of rear wall 146 are formed a series of pockets 150, 152, 154 and 156 for capturing fluid backflow, thereby facilitating the ultimate closure of flapper assembly 120.

Rear wall 146 preferably has a first upper cam arm alignment plate 158 and an opposing parallel second upper cam arm alignment plate 160 formed on the upper vertical center of rear wall 146. Rear wall 146 further has a first lower cam arm alignment plate 162 and an opposing parallel second lower cam arm alignment plate 164 preferably positioned on the lower vertical center of rear wall 146. First upper cam arm alignment plate 158 and second upper cam arm alignment plate 160 are separated a sufficient distance to snugly receive first end 136 of cam arm 122. First lower cam arm alignment plate 162 and a second lower cam arm alignment plate 164 are separated a sufficient distance to snugly receive the mid-region of cam arm 122.

Flanking first and second upper and lower cam arm alignment plates, 158, 160, 162 and 164, respectively, are first cam arm mounting bracket 166 and second cam arm mounting bracket 168. First cam arm mounting bracket 166 and second cam arm mounting bracket 168 are preferably somewhat crescent shaped and comprise preferably centrally positioned first mounting bracket throughhole 170 and second mounting bracket throughhole 172, respectively, wherein first mounting bracket throughhole 170 and second mounting bracket throughhole 172 are horizontally aligned.

Pivotable cam arm 122 is seated and positioned between first, second, third and fourth cam arm alignment plates, 158, 160, 162 and 164, respectively, and first and second cam arm mounting brackets, 166 and 168, respectively, wherein cam arm mounting pin throughhole 132 is aligned with first and second mounting bracket throughholes 170 and 172, respectively, and wherein first elongated sidewall 128 of cam arm 122 approximately abuts rear wall 146 of valve plate assembly 140. Once positioned, cam arm 122 is secured to valve plate assembly 140 by inserting cam arm mounting pin 184 through first mounting bracket throughhole 170, cam arm mounting pin throughhole 132 and second mounting bracket throughhole 172. First and second ends of cam arm mounting pin 184 are preferably fitted with lock rings 186 and 188 to secure cam arm mounting pin 184 in position, wherein lock rings 186 and 188 snugly rest within a peripheral recessed area formed on each end of cam arm mounting pin 184. Once attached, the valve plate assembly 140 preferably does not pivot relative to the cam arm 122. As an alternative, some relative movement can be accommodated.

As best shown in FIGS. 5, 8 and 11, flanking first cam arm mounting bracket 166 are throughholes 174 and 180, and flanking second cam arm mounting bracket 168 are throughholes 176 and 178. Throughholes 174, 176, 178 and 180 extend through valve plate assembly 140 and are dimensioned to receive bolts 302, 300, 304 and 306, respectively, to secure closure plate 220, plate seal 200 and valve plate assembly 140 together. A peripheral lip 201 extends from front wall 142 of valve plate assembly 140 thereby defining a recessed area 182 dimensioned for receiving on the inner diameter thereof plate seal 200. Plate seal 200 is preferably washer-like in shape, and comprises a front wall 202, an outer peripheral wall 204, a rear wall 206 and an inner peripheral wall 208. Plate seal 200 further preferably has a centrally positioned passage 210 therethrough defined by inner peripheral wall 208. Plate seal 200 is dimensioned to be received within recessed area 182 of valve plate assembly 140 such that rear wall 206 of plate seal 200 and outer peripheral wall 204 preferably abut front wall 142 and lip 201, respectively, of valve plate assembly 140.

With continued referenced to FIGS. 8 and 11, closure cap 220 is preferably a circular disk having a first section 222 and a second section 224, wherein second section 224 has a reduced diameter thereby forming lip 230 and area 226 opposite a front wall 228 of first section 222. Lip 230 on the periphery of second section 224 is dimensioned to be snugly received within passage 210 of plate seal 200, wherein lip 230 of second section 224 abuts inner peripheral wall 208 of plate seal 200, and wherein area 226 of plate cap 220 abuts front wall 202 of plate seal 200. Extending through closure cap 220 are throughholes 240, 242, 244 and 246, positioned to align with throughholes 174, 176, 178 and 180, respectively, of valve plate assembly 140 for receiving bolts 302, 300, 304 and 306, respectively.

Flapper assembly 120 is pivotably secured to check valve buttress 70 via cam arm pivoting pin 320 and cam arm lock rings 322 and 326. Cam arm pivoting pin 320 extends through first cam arm pin throughhole 108, through lock ring 322, through cam arm pivoting pin throughhole 134, through lock ring 326 and then through second cam arm pin throughhole 110. Both ends of cam arm pivoting pin 320 have a recessed area formed thereon for receiving and securing lock rings 330 and 332 therein.

Pivotable closure arm 340 is preferably forked in shape and comprises a first tong member 342, a second tong member 344 and a tong leg 346. First tong member 342 and second tong member 344 are separated by a width similar to the width of a follower wheel 360. First tong member 342 possesses a first follower wheel pin throughhole 348 and second tong member 344 possesses a second follower wheel pin throughhole 350. Tong leg 346 possesses a closure arm pin throughhole 352. Follower wheel 360 is preferably spool-like in shape with alignment lips on either edge and possessing a centrally positioned follower wheel pin throughhole 362. Follower wheel 360 is rotatably secured between first and second tong members 342 and 344, respectively, via follower wheel pin 364. Follower wheel pin 364 is located on a flapper contact end of the arm 340 and extends through first follower wheel pin throughhole 348 of first tong member 342, through follower wheel pin throughhole 362 of follower wheel 360 and finally through second follower wheel pin throughhole 350 of second tong member 344.

Pivotable closure arm 340 with secured follower wheel 360 is secured to check valve buttress 70 at a pivot end opposite the flapper contact end via closure arm pivoting pin 370 and springs 372 and 374. Closure arm pivoting pin 370 extends through first closure arm pin throughhole 104, through spring 372, through closure arm pin throughhole 352, through spring 374 and through second closure arm pin throughhole 106. Both ends of closure arm pivoting pin 370 are then fitted with closure arm pivoting pin nuts 376 and 378 to secure closure arm pivoting pin 370 in place.

Figure 12:
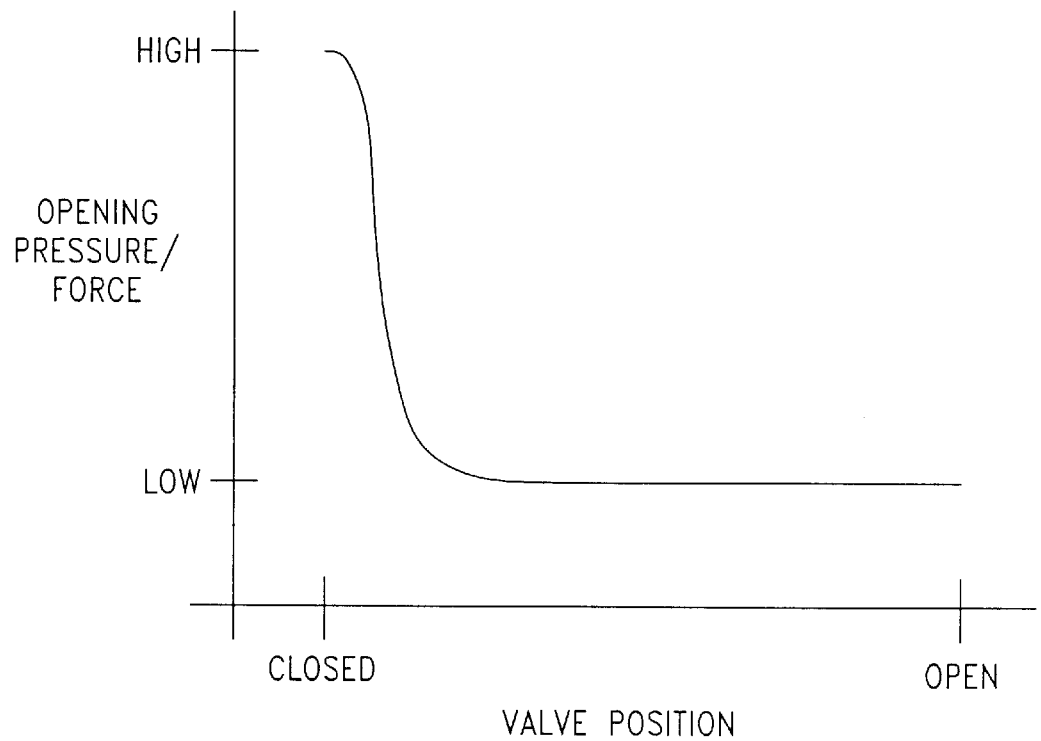
FIG. 12 is a graphical representation depicting the check-valve assembly position relative to fluid flow pressure.

Referring now to FIGS. 1–12, in use, check valve assembly 10 is secured to body A. When flapper 120 is in the closed position, plate seal 200 of valve plate assembly 140 abuts sealing surface 56 of valve seat 50, and cam surface 126 of the apex of hump 124 rests on follower wheel 360 as illustrated in FIGS. 8–8A. When the initial fluid supply pressure and force through conduit C (FIG. 3) are relatively large in the forward fluid flow direction F and pushes against front wall 228 of closure cap 220, flapper 120 is pushed off of sealing surface 56 of valve seat 50 toward a more open position as illustrated in FIGS. 9–9A. As a result, cam surface 126 of the apex of hump 124 pushes and rolls against follower wheel 360. A continued large forward flow results in follower wheel 360 of pivotable closure arm 340 to completely overcome hump 124, thus pushing flapper 120 to its fully opened position as illustrated in FIGS. 10–10A. When flapper 120 is in this fully opened position, follower wheel 360 is positioned at the base of hump 124 as illustrated in FIGS. 10–10A. As illustrated in FIG. 12, after flapper 120 has been opened fully, a low pressure and overall slower forward fluid flow is sufficient to maintain flapper 120 in its fully opened position.

Flapper 120 will fully close upon the occurrence of one of two events, a complete halt of forward fluid flow in direction F or backflow of fluid in direction B. When forward fluid flow stops, the pressure and force needed to hold flapper 120 in an opened position is absent. The tension generated in springs 372 and 374 during the initial opening of flapper 120, and the downward pivotation of pivotable cam arm 122, is released. In turn, this release in tension forces pivotable cam arm 122 to spring forward, forcing follower wheel 360 to rotate back over cam surface 126 of hump 124 so that the apex of hump 124 once again rests on follower wheel 360, resulting in closure of flapper 120 as illustrated in FIGS. 8–8A. When flapper 120 is in its closed position, plate seal 200 of valve plate assembly 140 once again abuts sealing surface 56 of valve seat 50.

In the event of backflow in direction B, fluid force will push against second section 224 and pocket 232 of closure cap 220 as well as accumulate in pockets 150, 152, 154 and 156 of valve plate assembly 140, forcing flapper 140 to fully close, via upward pivoting of pivotable cam arm 122 and rotation of follower wheel 360 back over cam surface 126 of hump 124. Once fully closed, plate seal 200 of valve plate assembly 140 abuts sealing surface 56 of valve seat section 50 thereby preventing backflow contamination of untainted fluid in the main supply pipeline.

Having thus described exemplary embodiments of the present invention, it should be noted by those skilled in the art that the within disclosures are exemplary only, and that various other alternatives, adaptations, and modifications may be made within the scope of the present invention. For instance, while the flapper assembly 120 and closure arm assembly 340 are shown pivotably attached, they could be configured to move linearly or pivot about different axes than those shown and still maintain the contacting follower and cam surface to perform as desired. Also, the follower wheel 360 could be lobed or merely be configured as a non-rolling skid to slide upon the cam surface. The lengths and pivot points of the assemblies 120, 340 could also be adjusted to alter performance characteristics to match desired design parameters. The check-valve assembly 10 could be removably inserted into a conduit body A as shown or build into the conduit body in an integral fashion. Accordingly, the present invention is not limited to the specific embodiments illustrated herein, but is limited only by the following claims.

What is claimed is:

1. A valve assembly for use in a fluid system having fluid flow therethrough, said valve assembly comprising:

a mounting member having a front surface, a rear surface and a passage therethrough, said mounting member positionable within the fluid system;

a flapper pivotably carried by said mounting member, said flapper having a front surface and a rear surface, said flapper having an open position and a closed position, wherein said flapper blocks fluid flow through said passage of said mounting member when said flapper is in said closed position;

a cam member defining a cam surface carried by said rear surface of said flapper, said cam member having a hump formed thereon;

a follower carried by said mounting member, said follower dimensioned to engage said cam member and slide thereon, wherein the fluid flow must be at a predetermined minimum pressure on said front surface of said flapper to allow said follower to initially overcome said hump of said cam member thus allowing said flapper to pivot to said open position; and wherein said cam surface is configured to cause a closure force exerted on said flapper by said follower to be greater when said flapper is in said closed position than when said flapper is in said open position.

2. The valve assembly of claim 1, wherein said mounting member and said flapper are approximately cylindrically shaped.

3. The valve assembly of claim 1, wherein said cam surface is approximately a linearly sloped surface.

4. A valve assembly for use in a fluid system having fluid flow therethrough, said valve assembly comprising:

a mounting member having a front surface, a rear surface and a passage therethrough, said mounting member positionable within the fluid system;

a flapper pivotably carried by said mounting member, said flapper having a front surface and a rear surface, said flapper having an open position and a closed position, wherein said flapper blocks fluid flow through said passage of said mounting member when said flapper is in said closed position;

a cam member defining a cam surface carried by said rear surface of said flapper, said cam member having a hump formed thereon;

a follower carried by said mounting member, said follower dimensioned to engage said cam member and slide thereon, wherein the fluid flow must be at a predetermined minimum pressure on said front surface of said flapper to allow said follower to initially overcome said hump of said cam member thus allowing said flapper to pivot to said open position; and wherein said follower is a wheel having a recessed area, and wherein said cam surface engages within said recessed area.

5. The valve assembly of claim 4, wherein said follower wheel has a midpoint, and wherein said midpoint of said follower wheel rest approximately below said hump of said cam surface when said flapper is in said closed position.

6. The valve assembly of claim 4, wherein said follower wheel is pivotably carried by said mounting member.

7. The valve assembly of claim 6, further comprising a spring member carried by said follower wheel, wherein said spring member urges said follower wheel against said cam surface.

8. A fluid flow check valve for placement within a fluid flow conduit, comprising in combination:

a valve seat adapted to be placeable in a fixed position relative to the fluid flow conduit;

said valve seat at least partially surrounding a passage for fluid flow through said valve seat;

a flapper adapted to be placeable in at least two positions relative to said valve seat including a closed position and an open position;

said closed position of said flapper at least partially abutting said valve seat and at least partially blocking said passage;

said open position of said flapper providing less blockage of said passage than said closed position;

a closure arm, said closure arm adapted to move between at least two closure arm positions, wherein said closure arm and said flapper pivot in a common rotational direction when opening and closing;

said closure arm maintaining contact with said flapper;

said closure arm maintaining exertion of a closure force on said flapper urging said flapper toward said closed position of said flapper; and said closure force of said closure arm upon said flapper being greater when said flapper is in said closed position than when said flapper is in said open position.

9. The check valve of claim 8 wherein said closure arm has a pivot end pivotably attachable relative to said valve seat and a flapper contact end at which said closure arm maintains contact with said flapper.

10. The check valve of claim 9 wherein said closure arm is biased toward a position with said flapper contact end of said closure arm forced against said flapper.

11. The check valve of claim 10 wherein a spring is coupled to said closure arm, said spring biasing said closure arm toward a position with said closure arm contacting said flapper.

12. The check valve of claim 10 wherein said flapper contact end of said closure arm contacts said flapper at a non-linear cam interface such that said closure force of said closure arm against said flapper has a non-linear relationship with a position of said flapper between said open position and said closed position.

13. The check valve of claim 12 wherein said cam interface includes a follower on said closure arm flapper contact end and a non-linear surface on said flapper against which said follower contacts.

14. The check valve of claim 13 wherein said follower includes a wheel, said wheel rotating relative to said flapper contact end of said closure arm.

15. The check valve of claim 14 wherein said non-linear surface on said flapper has a hump thereon said closure arm having a length and position which causes said flapper contact end of said closure arm to be on a first side of said hump when said flapper is in said closed position and for said flapper end of said closure arm to pass to a second side of said hump opposite said first side of said hump when said flapper pivots toward said open position.

16. The check valve of claim 12 wherein said cam interface includes a follower on said flapper and a surface on said flapper end of said closure arm upon which said follower on said flapper moves when said flapper is moving between said open position and said closed position.

17. The check valve of claim 9 wherein said flapper is pivotably attached relative to said valve seat so that said flapper pivots between said closed position and said open position.

18. The check valve of claim 17 wherein both said flapper and said closure arm pivot in a common direction about separate axes parallel to each other.

19. The check valve of claim 18 wherein both said flapper and said closure arm are pivotably coupled to a buttress attached to said valve seat.

20. The check valve of claim 19 wherein said closure arm includes a flapper end in contact with said flapper, said flapper end of said closure arm having a follower wheel thereon, said flapper including a cam surface thereon, said cam surface positioned so that said follower wheel of said flapper end of said closure arm rolls along said cam surface of said flapper.

21. A fluid flow check valve for a placement within a fluid flow conduit, comprising in combination:

a valve seat adapted to be placeable in a fixed position relative to the fluid flow conduit;

said valve seat at least partially surrounding a passage for fluid flow through said valve seat;

a flapper adapted to be placeable in at least two positions relative to said valve seat including a closed position and an open position;

said closed position of said flapper at least partially abutting said valve seat and at least partially blocking said passage;

said open position of said flapper providing less blockage of said passage than said closed position;

a closure arm, said closure arm adapted to move between at least two closure arm positions;

said closure arm maintaining contact with said flapper;

said closure arm maintaining exertion of a closure force on said flapper urging said flapper toward said closed position of said flapper;

said closure force of said closure arm upon said flapper being greater when said flapper is in said closed position than when said flapper is in said open position;

wherein said closure arm has a pivot end pivotably attachable relative to said valve seat and a flapper contact end at which said closure arm maintains contact with said flapper;

wherein said closure arm is biased toward a position with said flapper contact end of said closure arm forced against said flapper;

wherein said flapper contact end of said closure arm contacts said flapper at a non-linear cam interface such that said closure force of said closure arm against said flapper has a non-linear relationship with a position of said flapper between said open position and said closed position;

wherein said cam interface includes a follower on said closure arm flapper contact end and a non-linear surface on said flapper against which said follower contacts;

wherein said follower includes a wheel, said wheel rotating relative to said flapper contact end of said closure arm; and wherein said wheel is lobed in a non-circular fashion.

22. A fluid check valve comprising in combination:

an elongate hollow conduit body;

a valve seat fixed to said conduit body, said seat having a passage therethrough, said seat at least partially surrounding said passage;

a flapper movably attached to said conduit body;

said flapper having an open position primarily spaced from contact with said valve seat and at least partially allowing fluid flow through said passage;

said flapper having a closed position allowing less fluid flow through said passage than said open position;

a closure element within said conduit and biased toward contact with said flapper both when said flapper is in said open position and said closed position, wherein said closure element and said flapper pivot in a common rotational direction when opening and closing;

said closure element exerting a closing force on said flapper; and said closing force greater when said flapper is in said closed position than when said flapper is in said open position.

23. The check valve of claim 22 wherein a region of contact between said flapper and said closure element includes a cam surface and a follower surface.

24. The check valve of claim 23 wherein said follower surface is located on said closure element and said cam surface is located on said flapper.

25. The check valve of claim 24 wherein said follower surface includes a rolling wheel on an end of said closure arm.

26. The check valve of claim 25 wherein said closure arm has an end opposite said rolling wheel which is pivotably fixed relative to said conduit body.

27. The check valve of claim 26 wherein said flapper is pivotably fixed relative to said conduit body.

28. The check valve of claim 23 wherein the cam surface is non-linear.

29. The check valve of claim 22 wherein said closure element is a closure arm pivotably fixed relative to said conduit at an end opposite an end biased toward contact with said flapper.

30. The check valve of claim 29 wherein said flapper pivots relative to said conduit.

31. A fluid flow check valve for placement within a fluid flow conduit, comprising in combination:

a valve seat adapted to be placeable in a fixed position relative to the fluid flow conduit;

said valve seat at least partially surrounding a passage for fluid flow through said valve seat;

a flapper adapted to be placeable in at least two positions relative to said valve seat including a closed position and an open position;

said closed position of said flapper at least partially abutting said valve seat and at least partially blocking said passage;

said open position of said flapper providing less blockage of said passage than said closed position;

a closure arm, said closure arm adapted to move between at least two closure arm positions;

said closure arm maintaining contact with said flapper;

said closure arm having a pivot end pivotably attachable relative to said valve seat and a flapper contact end at which said closure arm maintains contact with said flapper;

said closure arm being biased toward a position with said flapper contact end of said closure arm forced against said flapper;

said closure arm maintaining exertion of a closure force on said flapper urging said flapper toward said closed position of said flapper; and said flapper contact end of said closure arm contacts said flapper at a non-linear cam interface such that said closure force of said closure arm against said flapper has a non-linear relationship with a position of said flapper between said open and said closed position;

said cam inteface including a follower on said closure arm flapper contact end and a non-linear surface on said flapper against which said follower contacts; and said closure force of said closure arm upon said flapper being greater when said flapper is in said closed position than when said flapper is in said open position.

* * * * *

UNITED STATES PATENT AND TRADEMARK OFFICE
CERTIFICATE OF CORRECTION

PATENT NO.    : 6,648,013 B1
DATED         : November 18, 2003
INVENTOR(S)   : Ernest B. Ray It is certified that error appears in the above-identified patent and that said Letters Patent is hereby corrected as shown below:

<u>Title page,</u>
Item [75], Inventor, replace "Marysville" with -- Red Bluff --.

<u>Column 2,</u>
Line 58, after "view" insert -- of --.

<u>Column 6,</u>
Line 33, replace "referenced" with -- reference --.

<u>Column 12,</u>
Line 40, replace "inteface" with -- interface --.

Signed and Sealed this

Twenty-fifth Day of May, 2004

JON W. DUDAS
*Acting Director of the United States Patent and Trademark Office*